Jan. 23, 1934.     C. B. KRAUSE     1,944,245
FOOD PREPARING MACHINE
Filed July 30, 1931     2 Sheets-Sheet 2
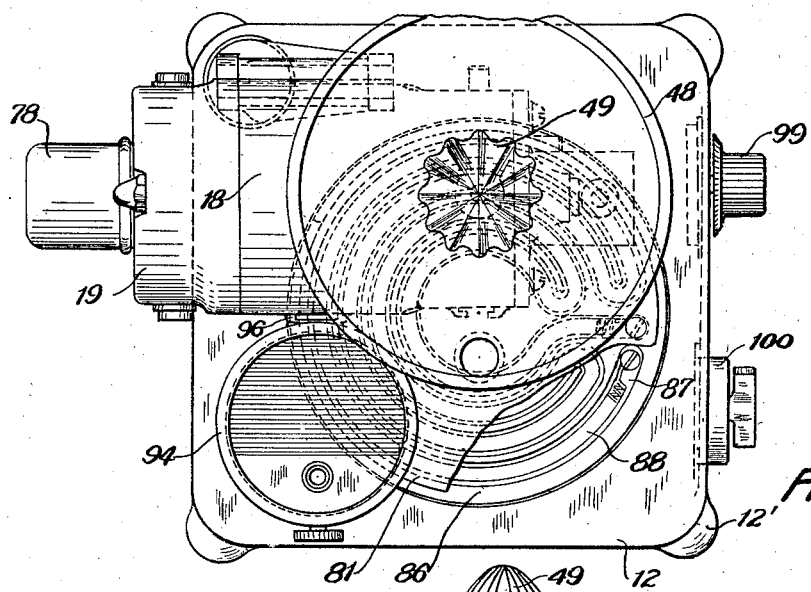
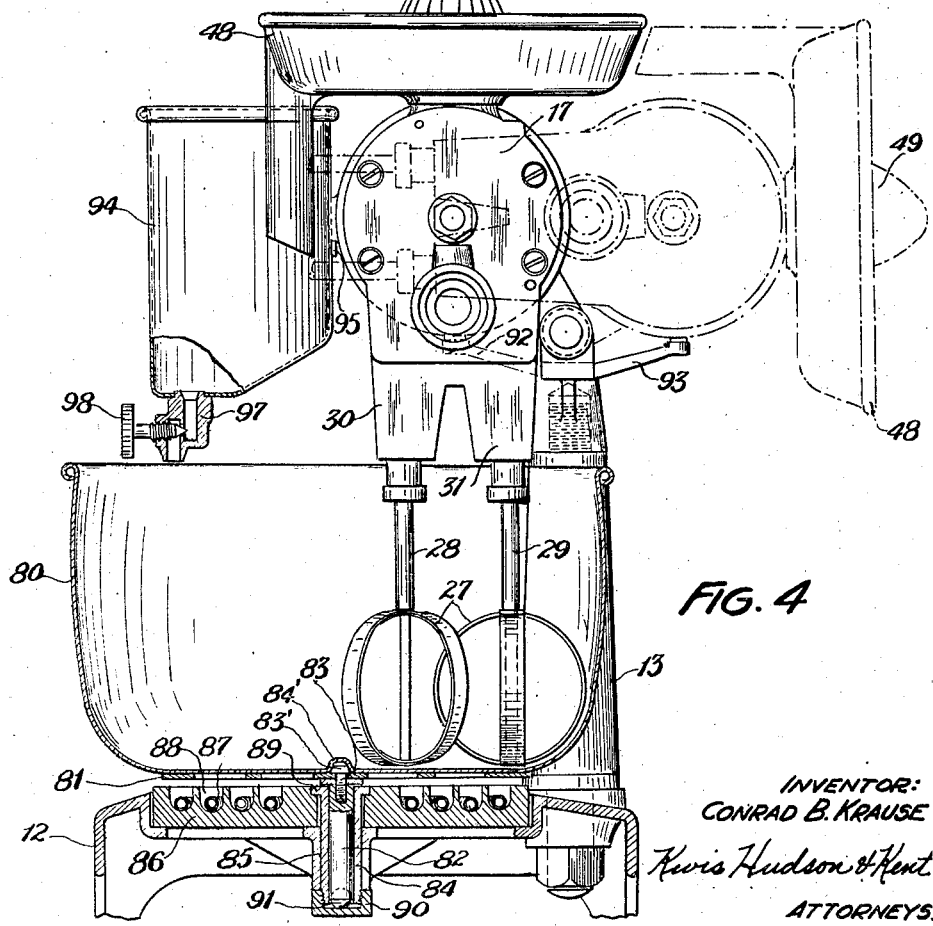
INVENTOR:
CONRAD B. KRAUSE
Kwis Hudson & Kent
ATTORNEYS.

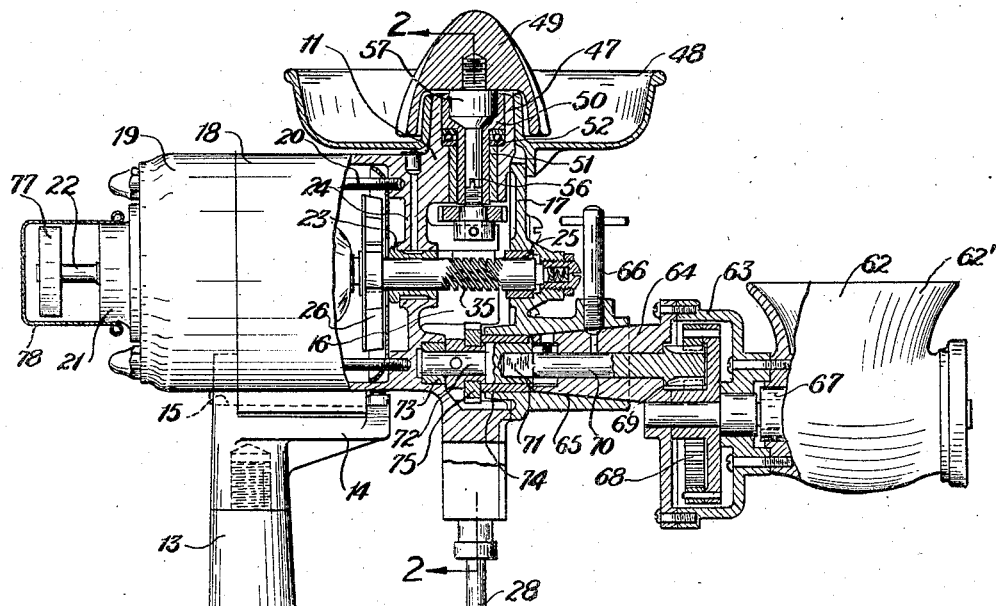

Patented Jan. 23, 1934

1,944,245

UNITED STATES PATENT OFFICE 1,944,245

FOOD PREPARING MACHINE

Conrad B. Krause, Cleveland, Ohio

Application July 30, 1931. Serial No. 553,965

6 Claims. (Cl. 259—105)

This invention relates generally to apparatus for preparing food, and more particularly to an improved machine of this kind embodying a plurality of power driven implements adapted to perform different operations.

As one of the objects of my invention, I aim to provide an improved machine of the kind mentioned, embodying means for supplying heat to the material being prepared.

Another object of my invention is to provide novel apparatus of the kind referred to, having a gear mount or casing and a plurality of implement actuating shafts journaled therein with their axes in angularly disposed relation to each other and lying substantially in the same vertical plane.

Still another object of my invention is to provide an improved food preparing machine embodying novel means for operating a plurality of different implements.

Still another object of this invention is to provide an improved food preparing machine embodying a novel form of agitator mechanism.

A further object of this invention is to provide a novel form of guard or cover for a motor driven implement.

Other objects and advantages of this invention will be apparent from the following description when taken in conjunction with the accompanying sheets of drawings, wherein:

Figure 1 is a side elevational view, partly in section, showing a food preparing machine constructed according to my invention;

Fig. 2 is a sectional view taken substantially on line 2—2 of Fig. 1;

Fig. 3 is a top plan view of the machine illustrated in Fig. 1, but with the food chopping mechanism detached;

Fig. 4 is an elevational view of the machine as shown in Fig. 3, with parts thereof in section;

Fig. 5 is a detail sectional view of one of the agitator spindles taken on line 5—5 of Fig. 2; and Fig. 6 is a detail elevational view showing the agitator spindle retaining means.

In the accompanying drawings, to which detailed reference will presently be made, I have shown a preferred embodiment of the food preparing machine of my invention, but it should be understood, however, that various changes may be made in the machine without departing from the spirit and scope of my invention, as defined by the appended claims.

In general, the food preparing machine of my invention comprises a supporting frame or stand 10, and a gear mount or casing 11, which is mounted upon the frame and operably supports a plurality of implements for performing different operations. The frame or stand may be of any suitable construction, such as that shown in the drawings, comprising a platform-like base 12 having supporting feet 12', and a substantially vertically extending pedestal or bracket 13 for supporting the gear casing. At its upper end the pedestal is provided with a forked head 14, having a pivot pin 15, mounted therein, and upon which the gear casing is pivoted for swinging movement.

The gear casing itself may be formed as a casting having a gear chamber 16 therein, which is adapted to be closed by the removable cover 17. At the side of the gear casing opposite the removable cover 17, I provide an integral hollow shell-like extension 18 of suitable size and shape to cooperate with the motor frame element 19 to form the casing or housing of an electric motor. This frame element may be secured in assembled relation with the shell 18 by means of suitable screws 20 extending into the gear casing 11. The frame element 19 is provided at the outer end thereof with a boss 21 having a suitable bearing therein for supporting one end of the armature shaft 22. At its opposite end, the armature shaft is supported by a bearing 23 mounted in the wall 24 of the gear casing, and also by a bearing 25 mounted in the removable cover 17. When the frame element 19 is secured in complementary assembled relation with the shell 18, as shown in Fig. 1 of the drawings, the armature and the field windings are housed and retained in the casing formed by these elements. If desired, a fan 26 of suitable construction may be provided on the armature shaft adjacent the inner end of the shell 18. This fan is so arranged that upon rotation of the armature shaft it will cause a circulation of cooling air through the motor casing.

To adapt my food preparing machine for the performance of an agitating or mixing operation, such as might be desirable in preparing certain foods, I provide a pair of beaters or agitators 27, of well known form, which normally extend downwardly from the gear casing to an operative position immediately above the base 12. The agitators 27 are provided with spindles 28 and 29, which extend upwardly into the bearing projections 30 and 31 of the gear casing for operative connection, respectively, with the drive shafts 32 and 33, which are rotatably mounted in suitable bearings 34 provided in the gear casing. The shafts 32 and 33 extend vertically in the gear casing, in substantially parallel spaced relation on opposite sides of the armature shaft 22, as shown in Fig. 2 of the drawings. That portion of the armature shaft, which traverses the chamber of the gear casing, and which is located between the bearings 23 and 25, is provided with helical teeth constituting a driving gear or worm portion 35. This worm portion meshes with helical gears 36 and 37 mounted respectively upon the shafts 32 and 33. With this arrangement of gearing having a suitable reduction ratio, it will be seen that the shafts 32 and 33 can be driven in opposite directions from the armature shaft 22, to drive the agitators 27 at the desired speed.

For operably connecting the agitator spindles 28 and 29 with the shafts 32 and 33, in such a way that the agitators can be readily removed from the machine, I provide the lower ends of the shafts 32 and 33 with sockets into which the agitator spindles telescope. To lock the agitator spindles for rotation with the shafts 32 and 33, I provide a transversely extending pin 38 in each of the sockets, which cooperates with a slot 39 provided at the upper end of each agitator spindle. With this arrangement, it will be seen that when one of the beater spindles is inserted in the socket of its drive shaft, the slot 39 will receive the pin 38 and thereby lock the shaft and spindle for rotation together. For retaining the agitator spindles in the sockets of the drive shafts with the pins 38 in driving engagement with the slots 39, I provide a nut 40 at the lower end of each drive shaft, as shown in Fig. 2. This nut is threaded upon the drive shaft, and is provided with an opening large enough for an agitator spindle to be freely inserted into and removed from the socket of the drive shaft. As shown in Fig. 2, the upper portion of each agitator spindle is made somewhat larger in diameter than the lower portion thereof which carries the agitator 27. This enlarged portion is provided with a longitudinally extending groove or keyway 42, which receives a laterally extending tongue or lug 43 formed on the nut 40, when the spindle is inserted through the nut opening and into the recess of the drive shaft. As shown in Fig. 5, the depth of the groove 42 is made exactly equal to the height of the shoulder 44 which is formed by the enlarged upper end of the agitator spindle. After the spindle has been inserted into the socket of the drive shaft, and the pin 38 has engaged in the recess 39, the nut 40 is rotated relative to the drive shaft, causing the lug 43 to be moved out of alignment with the slot 42 and into engagement with the shoulder 44 so as to prevent the withdrawal of the agitator spindle. The rotation of the nut 40, to move the lug 43 into locking position, also causes the agitator spindle to be drawn further upwardly into the socket of the drive shaft, thereby taking up any lost motion which might exist and producing a connection which will be free from rattles or vibrations. If desired, the rotational movement of the nut 43 may be limited to approximately a quarter turn by means of a pin 45 which is mounted in the threaded lower end portion of each of the drive shafts 32 and 33 and projects into a recess 46 formed in the wall of the nut. Thus it will be seen that by simple rotation of the nut for approximately 90° the agitator spindle can be locked in tight driving engagement with the drive shaft, or can be released for withdrawal when the agitators are to be disconnected from the machine.

At the top of the gear casing, and in substantial vertical alignment with the axis of the armature shaft 22, I provide a tapered boss 47 upon which may be removably mounted the collector pan 48 of a fruit juice extractor. For operably supporting a reamer 49, centrally of the collector pan, I provide a hollow shaft 50 or arbor, which is rotatably mounted in vertical position in a bearing 51 carried by the boss 47, and which is supported by a thrust bearing 52 also mounted in this boss. At its lower end, this hollow shaft is provided with a threaded plug 53 to which is secured a spur gear 54. This spur gear meshes with a pinion 54' mounted on the agitator drive screw 33. At its upper end, the plug is provided with a screw-driver projection 55 adapted for driving engagement with a slot 56 formed at the lower end of a spindle 57, which carries the reamer 49, and which is removably seated in the hollow shaft 50. The reamer itself may be of any desired form of construction, such as a suitably shaped body of glass or composition, which is tightly secured to the upper end of the spindle 57. It will be seen that from the arrangement just described the reamer spindle engages in the hollow shaft 50 in such a way that the reamer can be removed for cleaning, and when in place will be operably connected with the gear 54 by means of the slot and projection connection.

To adapt the machine for food grinding or chopping operations, I provide a food chopper 62, of the usual form of construction, which is operably associated with the gear casing 11. The body 62' of this food chopper is mounted upon a gear casing 63, which is, in turn, supported from the gear casing 11 by being provided with a tapered extension 64, removably engaging in the tapered recess of a boss 65 formed integral with the cover 17. The extension 64 may be retained in the boss 65 by means of a suitable clamping screw 66. The knife or cutting element 67 of the food chopper may be driven by any suitable reduction gearing arranged in the gear casing 63. In this instance, this gearing is shown in the form of an internal gear 68, which is mounted on the knife shaft and is driven by a pinion 69 formed on the end of a spindle 70 axially journaled within the extension 64. The end of the spindle 70, which projects from the extension 64, is provided with a nut portion 71, preferably square, which engages in a correspondingly shaped socket provided on the shaft 72. The latter shaft is rotatably mounted in bearings 73 and 74 provided in the gear casing, and carries a helical gear 75. This helical gear meshes with the helical teeth of a worm portion 76 provided on the shaft 32, so that the shaft 72, and also the knife of the food chopper, will be driven from the electric motor through the shaft 32 which actuates one of the agitators. From the arrangement described, it will be seen that the food chopper can be removed when not in use, and when needed can be quickly mounted on the cover of the gear casing and secured in place by the clamping screws 66, with the nut portion 71 of the spindle 70 operably engaging in the socket of the shaft 72. If desired, a suitable thrust bearing 76' may be provided at the upper end of the shaft 32 to take up the thrust reaction incident to the operation of the food chopper.

To adapt the machine to perform buffing or polishing operations, I provide a buffing wheel 77, of suitable construction, which is mounted upon an extension of the armature shaft 22. This buffer may be used for any desired purpose, such as for polishing silverware and various other utensils. To conceal and protect the buffer, when not in use, I provide a protective guard or casing 78. This guard may be in the form of a cup-shaped sheet metal stamping, which is adapted to be detachably secured in place by frictional engagement with the boss 21 of the motor casing. When the buffing wheel is not being used, it may be enclosed within the casing 78, which protects the wheel from damage and also gives the machine a neat appearance.

As shown in the drawings, the base 12 of the supporting frame constitutes a support for a work holder, such as the container 80 into which the agitators 27 may extend. The container may be supported directly on the base, but I prefer to provide a form of support which will permit rotation of the container during the operation of the agitators 27. This support comprises a suitably formed platen or mount 81 which is secured to a spindle 82 as by means of a screw 83. The spindle 82 is rotatably mounted in a sleeve 84 which is supported in vertical position in the boss 85 of the base. In addition to its function of securing the platen 81 to its spindle 82, the screw 83 may be used as a means for conveniently centering the container 80 with respect to the axis of rotation of the platen. To accomplish this purpose, the head 83' of this screw is allowed to extend above the surface of the platen for engagement in the recess 84' which is formed centrally of the bottom wall of the container.

As an important feature of my invention, I provide a heater in the base 12, so that heat may be supplied to the container when desired for certain food preparing operations. This heater may be of any suitable form of construction, such as that herein illustrated, comprising a block or body 86 of insulating refractory material, which is mounted in a recess of the base. This body of refractory material may be provided with one or more grooves 87 in which is disposed a heating element 88, such as an electrical resistance element. To retain the body of insulating material in the recess of the base, I provide the sleeve 84, which extends through the body, with a laterally extending flange 89, and at the lower end of the sleeve I provide a clamping nut 90 which engages the boss 85 to draw the flange 89 into clamping engagement with the body of refractory material. The nut 90 may also constitute a support for the ball 91 which forms an anti-friction thrust bearing for the spindle 82.

To enable the operator to readily insert and remove the agitators 27 from the container 80, which is supported upon the rotatable mount 81, the gear casing is pivotally connected to the pedestal 13, as explained above. To limit the tilting movement of the gear casing, stops of suitable form may be provided, such as the oppositely extending arms 92 and 93 formed integral with the forked head of the pedestal, as shown in Fig. 4 of the drawings. The arm 92 limits the swinging movement of the gear casing in one direction so as to correctly position the agitators with respect to the container 80, while the arm 93 limits the swinging movement of the gear casing when tilted in a direction to swing the agitators upwardly out of the container.

When the apparatus is to be used for a certain agitating operation, such as the making of salad dressing, it may be desirable to provide for a gradual feeding of oil, or the like, into the container 80. Accordingly, I provide a receptacle 94 which is supported in a position above the container 80. This receptacle may be removably supported upon the gear casing, or other appropriate part of the machine, by providing the receptacle with a wedge-like projection 95, which is adapted for engagement in the undercut slot of a bracket 96 formed integral with the gear casing. The receptacle is made of a size to accommodate a suitable volume of liquid, and at its lower end may be provided with a simple form of valve 97 having a regulating screw 98 for controlling the rate of feed of the liquid into the container 80.

The speed, at which the implements are to be driven, may be controlled by the provision of suitable means for regulating the speed of operation of the driving motor, such as a rheostat located in the base 12 and having a conveniently located control knob 99. Likewise, the supply of current to the heating element 88 may be controlled by a switch 100, which is also conveniently located upon the base 12.

It will now be seen that I have provided a very efficient and compact food preparing machine embodying means for supplying heat during the mixing operation. It will also be seen that the arrangement of drive shafts which I have provided in the gear casing affords an efficient drive for various implements, and permits the latter to be arranged in a position most appropriate for use by the operator. For example, the food chopper extends in a horizontal direction, which is most desirable for apparatus of this kind, while the fruit juice extractor and the agitators extend in a vertical direction, which is most suitable for apparatus of this kind. Likewise, the buffing wheel is mounted on a horizontally extending shaft, which is the most suitable arrangement for this form of implement. In the arrangement of apparatus which I have provided all of the gearing is enclosed in a centrally located casing, and the actuating shafts for the different implements extend into the casing in such a manner that gearing of simple form can be used to transmit power to the different implements at an appropriate speed ratio. Moreover, the arrangement which I have provided for the agitators and the reamer, permits the latter to be quickly and easily removed for cleaning purposes, and if desired, implements for performing various other operations can be substituted in their place.

While I have illustrated and described the apparatus of my invention in a detailed manner, it will be understood, however, that I do not intend to limit myself to the precise arrangements and construction of parts illustrated and described, but regard my invention as including such changes and modifications as do not involve a departure from the spirit of the invention and the scope of the appended claims.

Having thus described my invention, I claim:

1. In apparatus of the character described, the combination of a frame, a heater on said frame, a power driven implement carried by said frame and adapted to extend near said heater, a work holder, and means for supporting said work holder immediately above said heater including mounting means extending through said heater.

2. In apparatus of the character described, the combination of a frame, a heater on said frame, a power driven implement carried by said frame and adapted to extend near said heater, a hollow member on said frame extending through said heater, a work holder, and means supporting said work holder immediately above said heater including a member rotatably engaging in said hollow member.

3. In apparatus of the character described, the combination of a frame, a heater on said frame, a power driven implement carried by said frame and adapted to extend near said heater, a hollow member on said frame extending through said heater, a work holder, and means supporting said work holder immediately above said heater including a spindle rotatable in said hollow member, and a thrust bearing in said hollow member for supporting said spindle.

4. In apparatus of the character described, the combination of a frame having a table portion, a power driven implement mounted on the frame to extend near said table portion, a substantially vertically extending hollow boss carried by said table portion, a heater supported on said table portion, said heater having a body portion provided with an opening which is in substantial alignment with the opening of the hollow boss, a hollow sleeve extending through the openings of said boss and said body portion, said hollow sleeve having securing means at the ends thereof for holding the body and table portions together, and a work support disposed immediately above said heater and having a spindle rotatable in said hollow sleeve.

5. In apparatus of the character described, the combination of a frame having a recessed table portion, a power driven implement mounted on the frame to extend near said table portion, a substantially vertically extending hollow boss carried by said table portion, a heater having a body portion seated in the recess of said table portion and having an opening in substantial alignment with the opening of the boss, a hollow sleeve extending through the openings of the heater body portion and the boss, said sleeve having securing means at the ends thereof for retaining the heater body portion in said recess, and a rotatable work support disposed immediately above said heater and having a spindle portion engaging in said sleeve.

6. In apparatus of the character described, the combination of a frame having a table portion, a power driven implement mounted on the frame to extend near said table portion, a substantially vertically extending hollow boss carried by said table portion, a heater supported on said table portion, said heater having a body portion provided with an opening which is in substantial alignment with the opening of the hollow boss, a sleeve extending through the openings of the table portion and boss, securing means at the ends of said sleeve for retaining the heater body and table portions together including a cap at the lower end of the sleeve, a rotatable work support disposed immediately above the heater and having a spindle portion rotatably engaging in said sleeve, and a thrust ball between said cap and the lower end of the spindle.

CONRAD B. KRAUSE.